United States Patent [19]

Niskanen et al.

[11] Patent Number: 6,071,331
[45] Date of Patent: *Jun. 6, 2000

[54] METHOD AND APPARATUS FOR SEPARATING GAS FROM A GASEOUS MATERIAL

[75] Inventors: Toivo Niskanen, Hamina; Kari Peltonen, Karhula, both of Finland

[73] Assignee: Ahlstrom Machinery Corporation, Espoo, Finland

[*] Notice: This patent is subject to a terminal disclaimer.

[21] Appl. No.: 08/456,699

[22] Filed: Jun. 1, 1995

Related U.S. Application Data

[62] Division of application No. 08/182,036, Jan. 14, 1994, Pat. No. 5,462,585.

[30] Foreign Application Priority Data

Jul. 15, 1991 [FI] Finland .................................... 913404
Jul. 15, 1992 [FI] Finland ..................... PCT/FI92/00216

[51] Int. Cl.$^7$ .................................................. B01D 19/00
[52] U.S. Cl. ............................... 96/213; 55/399; 55/400; 55/457; 96/214; 96/217; 162/57; 210/512.3
[58] Field of Search .......................... 55/399, 400, 456, 55/457; 95/34, 35, 261, 270; 96/208, 213, 214, 217; 162/57, 58, 380; 210/512.1, 512.3

[56] References Cited

U.S. PATENT DOCUMENTS

| | | | |
|---|---|---|---|
| 887,893 | 5/1908 | Wickstrum et al. ....................... | 55/456 |
| 1,274,058 | 7/1918 | Kutsche ..................................... | 95/270 |
| 2,422,956 | 6/1947 | Edwards .................................... | 96/217 |
| 2,591,396 | 4/1952 | Bergner ..................................... | 55/400 |
| 2,808,784 | 10/1957 | Di Stefano ................................. | 96/214 |
| 3,895,930 | 7/1975 | Campolong ............................... | 55/457 |
| 4,344,774 | 8/1982 | Skipper ..................................... | 95/261 |
| 4,481,020 | 11/1984 | Lee et al. ................................... | 96/214 |
| 4,519,990 | 5/1985 | Bevilaqua et al. ........................ | 55/457 |
| 4,637,779 | 1/1987 | Sherman et al. .......................... | 415/143 |
| 4,826,398 | 5/1989 | Gullichsen ................................ | 415/143 |
| 4,877,424 | 10/1989 | Perkola et al. ............................ | 95/270 |
| 4,964,622 | 10/1990 | Sherman ................................... | 266/168 |
| 5,171,405 | 12/1992 | Torregrossa .............................. | 162/243 |
| 5,263,774 | 11/1993 | Delcourt ................................... | 366/305 |
| 5,266,160 | 11/1993 | Henricson et al. ....................... | 162/57 |
| 5,462,585 | 10/1995 | Niskanen et al. ......................... | 55/400 |

FOREIGN PATENT DOCUMENTS

| | | | |
|---|---|---|---|
| 0330387 | 8/1989 | European Pat. Off. . | |
| 55-14693 | 4/1980 | Japan ........................................ | 55/457 |
| 1000055 | 2/1983 | Russian Federation ................. | 96/208 |
| 311875 | 5/1929 | United Kingdom ..................... | 55/457 |
| 554445 | 7/1943 | United Kingdom ..................... | 55/457 |
| 9013344 | 11/1990 | WIPO . | |

*Primary Examiner*—C. Scott Bushey
*Attorney, Agent, or Firm*—Nixon & Vanderhye P.C.

[57] ABSTRACT

Gas is separated from fluent material, particularly a liquid or a cellulose fiber suspension having a consistency of about 8–18%, utilizing a closed separation apparatus having a spiral housing with a central axis, a fluent material inlet channel, a fluent material outlet, and a gas outlet. A pressure differential is maintained between the inlet channel and the spiral housing, and the pressure differential is converted to kinetic energy of the fluent material by causing the fluent material to flow through one or more spiral flow paths through the inlet channel toward the spiral housing. In the spiral housing a rotor is rotated to impart a strong centrifugal force to the fluent material to cause gas to separate and collect adjacent the central axis of the spiral housing, from which the gas is removed. The strong centrifugal force caused by the rotating rotor discharges the fluent material through the outlet. The spiral flow paths rotate with the rotor in the spiral housing.

14 Claims, 7 Drawing Sheets

METHOD AND APPARATUS FOR SEPARATING GAS FROM A GASEOUS MATERIAL

This is a divisional of application Ser. No. 08/182,036, filed Jan. 14, 1994, now U.S. Pat. No. 5,462,585.

FIELD OF THE INVENTION

The present invention relates to a method and an apparatus for separating gas from a gaseous material preferably in a closed process. The method in accordance with the present invention is especially suitable for chemical processes in the wood processing industry so as to minimize the environmental disadvantages thereof. The apparatus in accordance with the present invention is applicable, for example, for the separation of residual gases of bleaching processes from fiber suspensions of wood processing industry. While the apparatus in accordance with a preferred embodiment of the invention is mainly designed for the discharge of gas, it may also be used for the discharge of fiber suspension bleach towers. The arrangement in accordance with another embodiment of the present invention is preferably applied in the discharge of gas from low consistency pulps, whereby the consistency of the pulp may be even below 5%.

PRIOR ART

There is a number of known gas discharge apparatuses, which have been used for removal of residual gases of a bleaching stage from fiber suspensions. U.S. Pat. No. 4,209,359 discloses a process for separating residual oxygen from pulp which has been bleached with oxygen. The separation apparatus in accordance with said patent is a relatively large vessel, to which the bleached pulp is discharged from a bleaching stage and in which the pulp is treated at a consistency of about 3%. The pulp is supplied to the vessel tangentially, whereby said pulp is subjected to a centrifugal force, which facilitates the separation of gas in a known manner so that a portion of the gas may be discharged directly from this stage. Thereafter the pulp is allowed to flow to the bottom of the vessel, where pulp is mixed for about 30 seconds to 5 minutes with two mixers of different types, of which the upper is used for pumping the pulp axially downwards and the lower is used for pumping the pulp radially outwards, whereby the pulp is brought into a circulating movement, by means of which residual gas is separated from the pulp.

Disadvantages of the disclosed apparatus are, for example, that it is necessary to dilute the pulp to a low consistency merely for the gas discharge and that the process pressure is not utilized in the form of dynamic pressure whereby, when the vessel and the inlet channel are relatively large, the centrifugal force remains small and the gas separation capacity low. As known, bleaching is carried out preferably at a consistency of about 10 to 12%, whereafter the bleached pulp is led to a washing stage either directly or through a gas separator. If residual gas is not separated from the pulp prior to washing, said gas in the pulp complicates the washing and weakens the washing result considerably. A number of washer types are known in the industry, to which pulp may be supplied at a so called MC consistency (medium consistency), whereby also gas should be removed from the pulp at the MC consistency. Washers operating at the MC range are, for example, diffusers, belt washers and so called DD washers. If it is necessary to dilute the pulp prior to the washing for removal of gas, larger amounts of liquid must be pumped to the washing than if the consistency is maintained original. For example, when the consistency is 3%, there is about 30 kg water in the pulp for each fiber kilogram. When the consistency is about 12% the amount of water has decreased to about 5 kg per a kilogram of fibers. Thus, when the consistency quadruples the amount of the water decreases to one sixth of that of the low consistency. In other words, the dilution of pulp results in that, if MC washers are used, the pulp must be thickened again or alternatively low consistency washers must be used, for example, a suction drum filter, whereby the amount of water—in a way excessive—to be pumped to the washer is sixfold. Moreover, the arrangement in accordance with the disclosed publication has several portions of the apparatus exposed to the atmosphere, whereby the treatment of pulp does not take place in a hydraulically closed pressurized system. FIG. 6 discloses the process of said patent specification illustrating a bleaching tower 36, a gas separator 10 and a filter 46 which are all open unpressurized apparatuses. They allow the contact between the pulp and the air and thus result in foaming and odor problems.

U.S. Pat. No. 4,362,536 discloses an apparatus, by means of which gas may be removed from the pulp flowing in a channel prior to its free fall to a pulp vessel or the like member. The separation of gas is carried out in such a way that the gaseous pulp tangentially enters the separation apparatus, in which a rotatable rotor accelerates the rotational speed of the pulp and the gas is separated due to a centrifugal force to the center of the apparatus, from where it is removed. Gas is prevented from entraining the pulp by using baffle plates. The rotor is not designed to increase the pressure of the pulp, since it is not necessary when the pulp is allowed to fall freely to the vessel below. The apparatus is not applicable in a closed process, which requires a controlled gas discharge allowing fluctuation in pressure and a pressurized pulp discharge. Also the correct pressure difference between the entering pulp, the pulp to be discharged and the exiting gas must be maintained. It is also preferable to be able to increase the pressure of the exiting pulp in the gas separator, which is possible with the apparatus in accordance with the present invention, by means of which it is possible to decrease the pressure level of the reaction vessel and thus decrease the investment costs, unless it is necessary to further transfer the pulp with a pump. It has been possible to eliminate the disadvantages of both the apparatuses and the methods of the above mentioned prior art references with an apparatus in accordance with international patent application WO90/13344 of A. Ahlstrom Corporation, which apparatus is located in the outlet of a pressurized pulp treatment reactor or the like or in the flow channel extending therefrom. The rotor of said apparatus is preferably formed of a rotationally symmetric casing, which is concentrically attached to a flange located substantially perpendicular to the axis of the rotor, and on the flange end thereof there are openings for the discharge of the gas-free suspension towards the discharge opening. Said arrangement is described more in detail in FIG. 1 and in the description thereof. It is typical of the method and apparatus in accordance with said patent application that gas may be separated from medium consistency pulp by disposing the apparatus in accordance with the application in the outlet of a closed reactor and the apparatus itself carries out the discharge of the reactor, the gas separation allowing the fluctuation in pressure and feeds the pulp further at an increased pressure. Due to its construction and control said apparatus can discharge gases without any pulp fibers entrained in them even if the pressure in the reaction vessel varies. The operation of the apparatus includes therefore both the gas separation and the purification of gas. The fibrous material separated in the purification of gas is recirculated through a gas separation apparatus to the pulp flow. A preferred embodiment of the gas separation apparatus carries the specific feature that it can increase the pressure of the exiting pulp.

Said prior art apparatus may still be developed to enable the utilization of pressure in said pulp vessel for the gas separation.

DISCLOSURE OF THE INVENTION

The object of the present invention is to eliminate or minimize the problems occurring in the apparatus in accordance with U.S. Pat. No. 4,209,359. The aim of the process and apparatus in accordance with our invention is to treat the pulp in an as air-free space as possible. In other words by pressurizing the apparatus gas is prevented from mixing with the pulp and by removing gas from the pulp, the disadvantages of the gas in the process are minimized.

Thus it is characteristic of the invention that an apparatus is provided in the discharge/flow channel for pulp, the purpose of which is to convert the process pressure to dynamic pressure and to pass the pressurized pulp suspension being discharged from the vessel to circulate along the inner surface of the flow channel at as high speed as possible, whereby due to a strong centrifugal force gas is separated from the pulp very efficiently and it may be discharged from the apparatus in a manner known from the prior art apparatus. Further it is characteristic of the invention that pulp is discharged under pressure from the apparatus so that the pulp may be directly supplied to the next treatment apparatus with the pressure of the gas separator.

The method in accordance with the present invention is characterized in that the pressure difference between the inlet channel and the gas discharge is converted to kinetic energy by turning the direction of flow of material to a spiral rotational movement in the inlet channel;

gas is separated from the material to the center of the separation apparatus by means of the created strong centrifugal force;

gas is discharged to a separate further treatment; and the kinetic energy of the circulating flow of material is converted back to pressure energy.

It is characteristic of the apparatus in accordance with the present invention that in the inlet channel for the material or communicating with such there are means for converting the pressure difference between the inlet channel and the gas discharge to kinetic energy of material, in other words to a circulating movement of the material.

BRIEF DESCRIPTION OF THE DRAWINGS

The present invention is described below, by way of example, with reference to the accompanying drawings, in which.

DETAILED DESCRIPTION OF PREFERRED EMBODIMENTS

Figure 1:
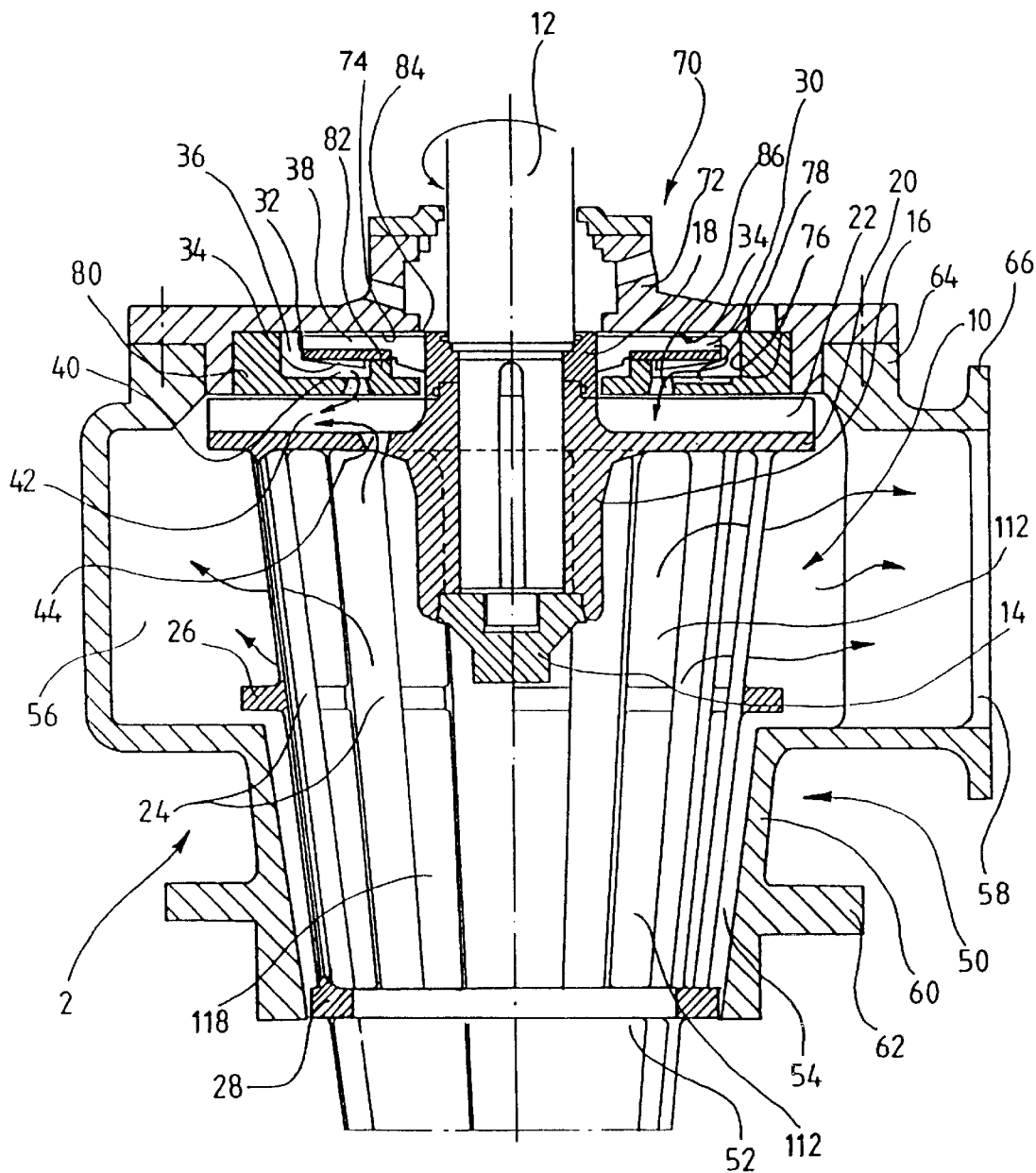
FIG. 1 illustrates a preferred embodiment of an apparatus as described in the international patent application PCT/FI90/00085 of A. Ahlstrom Corporation.

According to FIG. 1 a gas separation apparatus 2 in accordance with the prior art comprises three main portions: a rotor 10, a casing 50 of the rotor and a body 70 of the separation apparatus. Rotor 10 again comprises a first sleeve 16 and a second sleeve 18 mounted on a shaft 12. A flange 20 extends substantially radially from sleeve 16, said flange being provided on one side, the so-called rear side, with a number of rear blades 22 rotating in a so-called second separation chamber. The front side of flange 20 is provided with a number of blades 24, which are supported by rings 26 and 28. In other words, blades 24 form an axially or radially changing, rotationally symmetric shell 118. It is characteristic of the shell 118 that it is completely open from the center excluding the hub of the rotor (cf. screw 14) and that on the flange end the rotor is provided with openings 112 between the blades, through which openings 112 the pulp flows out of the rotor 10 and the ribs at the inlet channel prevent the pulp from blocking between the inlet channel and the blade.

There are a number of blades 30 extending from said second sleeve 18 of the rotor 10, the front surfaces of which blades are perpendicular to the shaft 12 and are provided with a disc 32 and the front side of said disc 32 is provided with a second series of substantially radial blades 34, which are, however, dimensionally remarkably smaller than the blades 30. The blades 30 and 34 and the disc 32 have been arranged to rotate in a separate chamber 36, in a so-called third separation chamber, which is divided by said disc 32 into two subchambers 38 and 40 said chamber 36 being separated from the rest of the rotor space by a partition wall, which is a part of the body of the separation apparatus. Thus the blades 30 rotate in the chamber 38 and the blades 34 in the chamber 40.

A casing 50 of the rotor 10 comprises an axial inlet opening 52, which extends as an inlet channel 54 following the shape of the rotor 10 towards a preferably spiral chamber 56, which is provided with a discharge opening 58. The inlet opening 54 and spiral chamber 56 form a so-called first separation chamber. The clearance between the inner wall of the inlet channel 54 and the blades 24 of the rotor is within the range of 5–50 mm depending to a large extent on the other dimensions of the gas separation apparatus. The outer side of the wall 60 of the inlet channel 54 is provided with a flange 62, by means of which it is possible to attach the gas separation apparatus either to a pipe line, a bleaching tower or some other applicable place.

The body 70 of the gas separation apparatus 2 comprises a rear plate 72 mounted to the annular flange 64 of the casing, said rear plate 72 being provided with sealing and bearings (not shown) for the shaft 12 of the rotor 10. Additionally, the rear plate 72 forms the rear wall 74 of the chamber 36 of the blade-disc-blade combination extending from the second sleeve of the rotor 10. A machined annular disc 80 forms a ring 76 and a front wall 78 of the chamber 36, the inner side of the annular disc 80 being further provided with a ring 82 in a location radially inwards from the blades 34 but, however, at a distance from the second sleeve 18, the ring 82 extending inside the chamber 34 close to the surface of the disc 32. The purpose of the ring 82 is to prevent the discharge of the medium from the chamber 40 to the space between the disc 32 and the sleeve 18.

The rear wall 74 of the chamber 36 is provided with a gas discharge opening 84, which may be an annular opening between the rear plate 72 and the second sleeve 18. Respectively an opening 86 is provided radially outside the ring 82 on the front wall 78 of the chamber 36, the opening 86 leading to a space 42, a so-called second separation chamber, defined by the rear blades 22 of the rotor and the front wall 78 of the chamber 36. Further, a flow channel 44 is arranged in the flange 20 of the rotor 10 or in the first sleeve 16 to lead the gas separated by the rotor to the space 42. It is preferable that the flow channel 44 is located closer to the shaft than the channel 80.

The apparatus in accordance with the prior art described above is used by mounting the apparatus in the discharge opening of a reaction vessel in such a way that the extended blades of the rotor extend into the vessel to some extent to mix the pulp in the vessel, which pulp in some cases may be even very thick, whereby the pulp flows at the pressure of the vessel through the inlet opening 52 of the apparatus to the inlet channel, in which the pulp is exposed to the rotational effect of the rotor 10. Since the rotor at least partially fluidizes the pulp and is able to accelerate the rotational speed of the pulp close to its own rotational speed, the pulp is able to be pressed more freely due to the centrifugal force against the rotor and the wall of the inlet channel to form an annular layer, whereby the gas separating from the pulp has ideal conditions to accumulate as bubbles and to drift towards the lower pressure in the center of the rotor. At the same time the rotational energy caused by the rotor in the pulp and the centrifugal force generating therefrom enables the increase of the pressure of the pulp at the outlet opening 58 compared with the inlet opening 52. Since the pressure is at its lowest close to the flange 20 around the sleeve 16 gas accumulates there and is discharged therefrom through the flow channel 44 to the space 42 behind the flange 20. Some pulp is also discharged with the gas to the space 42, whereby the purpose of rear blades 22 in said space 42 is to pump the pulp possible entrained in the space 42 back to the spiral chamber 56. The gas flows from the space 42 either due to pressure in the space or due to suction connected to the gas separation system through a gap between the annular disc 80 and the second sleeve 18 to the effective range of the blades 30, from where it flows further through a gas discharge opening arranged close to the sleeve 18 either directly to the atmosphere or, if further gas treatment is desired, to a treatment apparatus or a recovery system. The purpose of the blades 30 is to ensure that even if fibers still entrain with the gas flow through the gap between the annular disc 80 and the second sleeve 18 to the chamber 36, the blades 30 pump the pulp through the subchamber 38 around the outer edge of the disc 32 to the subchamber 40 and further through the opening 86 to the space 42, wherefrom the rear blades 22 pass the pulp further to the spiral chamber 56. Blades 30 in the subchamber 38 develop a greater pressure than the pressure prevailing at the opening 86 in the chamber 42, whereby the blades 30 in fact return the pulp through the chamber 40 to the chamber 42. The purpose of the blades 34 is merely to prevent the pulp in the subchamber 40 from densifying and forming lumps in the subchamber 40 by generating a sufficient turbulence in the pulp in the subchamber 40. Further, the purpose of the blades 30 and 34 is to make the gas separation apparatus as insensitive as possible to pressure fluctuations in the spiral chamber or in the inlet channel, in other words to ensure that the gas discharge channel from the separation apparatus is always open without any fibers in any case entering the gas discharge opening 84 in the rear plate 72.

Figure 2:
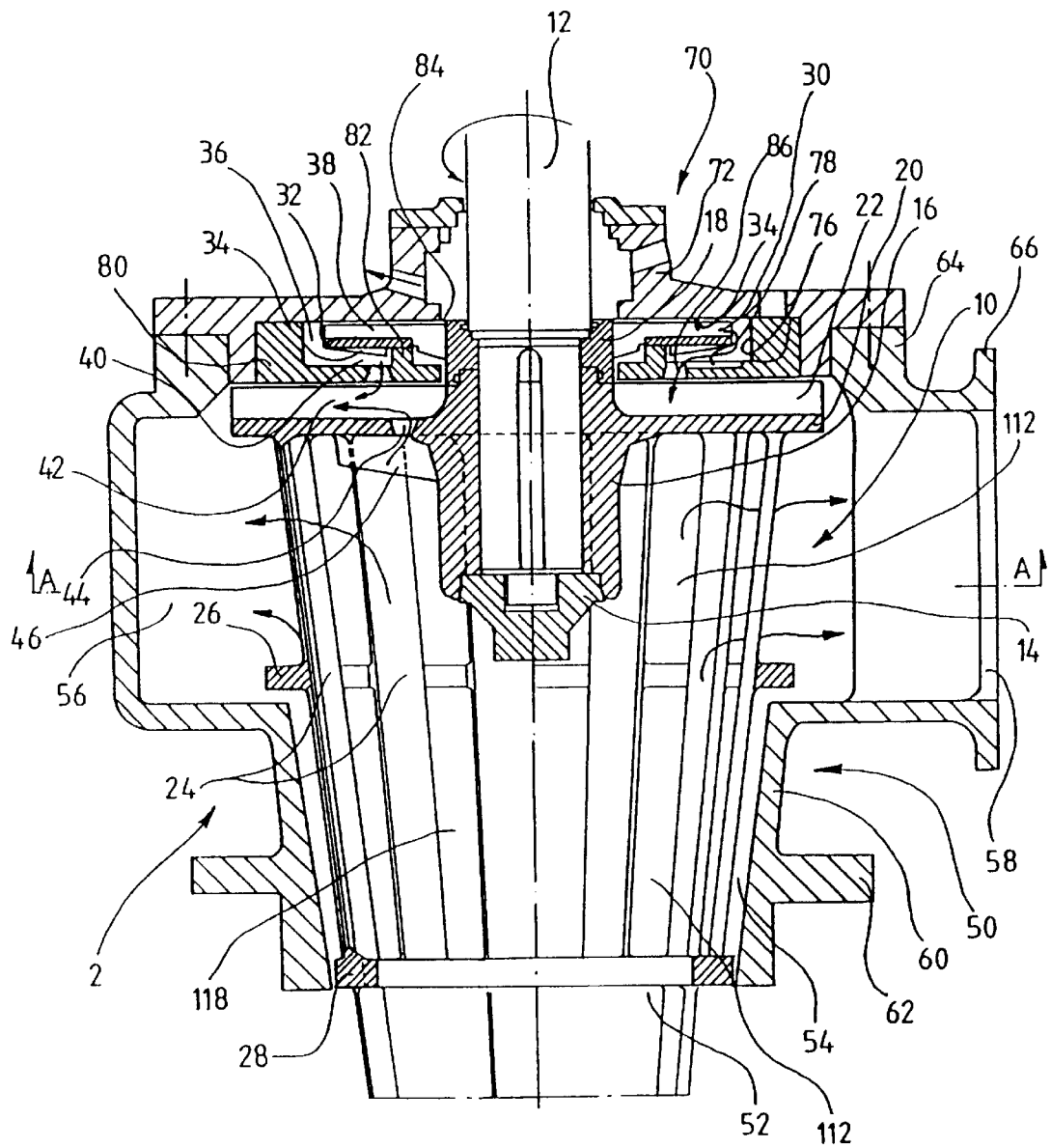
FIG. 2 illustrates another apparatus in accordance with the prior art, as it is in said patent application of A. Ahlstrom Corporation.

FIG. 2 illustrates a second gas separation apparatus 2 in accordance with the prior art, which apparatus is in principle similar to the apparatus in FIG. 1 excluding the flange 20. In the apparatus of FIG. 2, the front surface of the flange, i.e. the side by the blades 24, is provided with a few blades 46. The construction and operational principle of the blades 46 correspond to the construction and operational principle of the blades of a centrifugal pump. Their purpose is to feed the pulp from inside the shell formed by the blades 24 towards the spiral chamber 56 and further towards the discharge opening 58. Another purpose of the blades is connected with the location of the gas discharge openings and the gas removal process. Said gas discharge openings are preferably located in a dead space gathering air to the rear side of the blades. Said blades may also extend as far as to the inside of the spiral chamber 56. By increasing the number of said blades or the length thereof it is possible to improve the pressure increasing effect of the separation apparatus, which comes into question, when using the apparatus as a discharge apparatus of a bleaching tower for feeding the bleached pulp directly to the washer.

Figure 3:
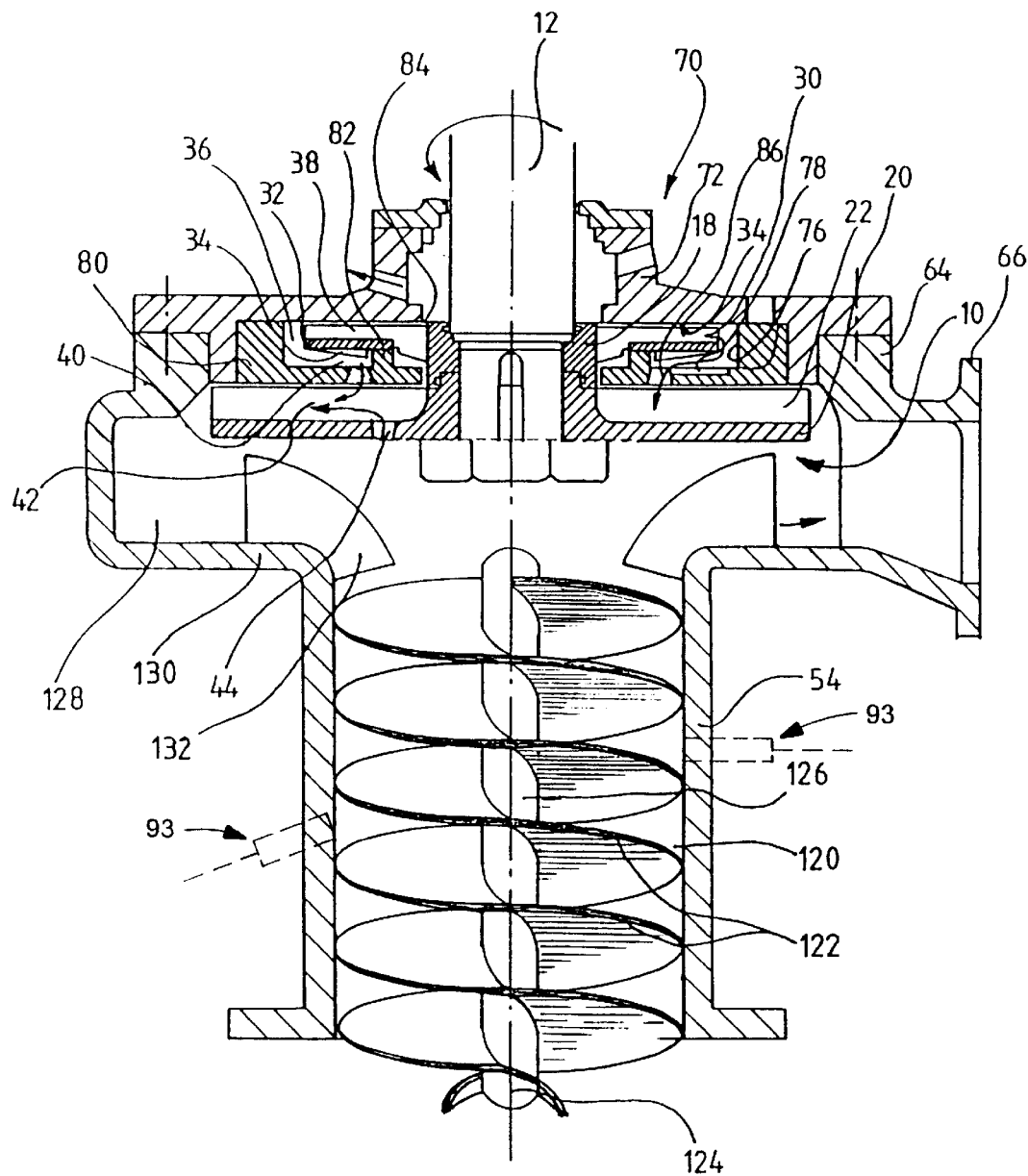
FIG. 3 illustrates an apparatus in accordance with a preferred embodiment of the present invention.

The embodiments of the apparatus in accordance with the invention with their variations illustrated in FIGS. 3–6 are up to the flange 20 identical with prior art apparatus considering the drive side of the apparatus (cf. the apparatus illustrated in FIGS. 1 and 2). FIG. 3 illustrates an apparatus in accordance with a preferred embodiment of the invention, which substantially differs from the apparatus in accordance with the prior art described above in the portion below the flange 20, i.e. by the inlet channel 54. The apparatus communicates by means of said inlet channel with the fiber suspension inlet channel, the discharge opening of a reaction vessel, or the like member. Said apparatus is designed for the treatment of a low consistency pulp or the like, in other words pulp, which does not tend to form a fiber matting clogging the flow channel when flowing, but flows almost like water. It is typical of the apparatus that the inlet channel 54 thereof is formed of at least one spiral flow channel 120 (the drawing illustrates two threads one within the other and thus two spiral flow channels), by means of which the pressure energy of the pulp being discharged to the apparatus due to the pressure difference, is converted to kinetic energy, which further due to the round shape of the cross-section of the inlet channel 54, results in a flow almost parallel to the rim and in generation of a strong centrifugal force by means of which the gas in the pulp is separated efficiently to the center of circulating flow. One method of arranging the spiral flow channel 120 is to mount one or more overlapping spiral strips 122 to the wall of the cylindrical inlet channel 54, the strips being restricted on the side of the shaft 124 of the apparatus to a stationary, relatively small cylindrical surface 126, whereby the cross-section of the flow channel(s) 120 is shaped rectangular. The inlet channel 54 of the apparatus is connected to a larger spiral casing 128 already known from, for example, a centrifugal pump, the front wall 130 of which having a number of guiding blades 132, the purpose of which is to slow down the speed of the pulp flow circulating along the thread and to increase the pressure for the discharge of pulp in a pressurized state from the apparatus. As in all other embodiments, the pulp is allowed to be discharged from the apparatus axially to the inlet channel where there is a surface (thread strips) inclined relative to the discharge direction, by means of which surface the axial movement of the pulp is turned to a circulating flow parallel to said surface. The operation of the apparatus may be illustrated as follows:

pressure energy→kinetic energy→pressure energy, in other words pressurized fiber suspension is supplied to the apparatus, the pressure is converted to kinetic energy, in other words circulating movement, which again at the end of the separation process is converted back to pressure energy, whereby the suspension exiting from the apparatus has a certain pressure.

The gas separated to the center around the shaft 124 of the apparatus, or the cylindrical surface 126 corresponding to the shaft, is discharged through openings 44 in the flange 20 to the space behind said flange, the openings 44 being located relatively close to the shaft 124 of the flange 20 of the rotor 10 disposed in the spiral 128. The following separation process of gases and fibers corresponds to what is described in our above described WO patent application. It is appreciated from the described apparatus that its construction is the simplest in the product family, and in said apparatus only the flange 20 of the rotor and the portion behind it are used for the separation of fiber suspension flowing through the gas discharge openings 44 to the rear side of the flange 20 from the gas being discharged.

Figure 4:
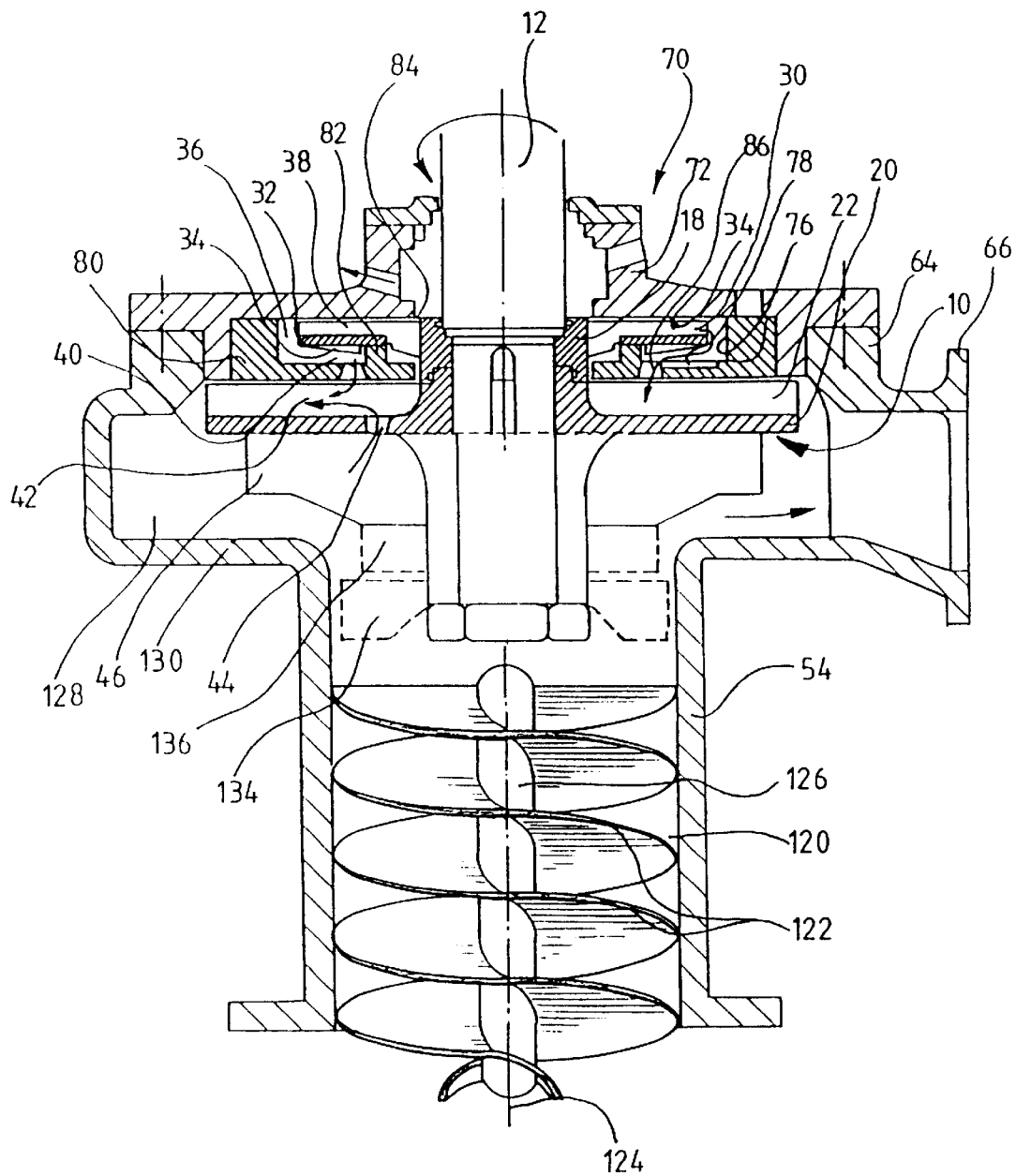
FIG. 4 illustrates an apparatus in accordance with a second embodiment of the present invention.

FIG. 4 illustrates an apparatus of the next technical development, in which the frontside of the flange 20 of the rotor 10 is provided with pumping blades 46, which replace the guiding blades 132 disclosed in FIG. 3 and by which the pressure of the pulp exiting from the apparatus is raised, if the discharge pressure reached with the embodiment of FIG. 3 is not high enough. Further, FIG. 4 illustrates with broken lines auxiliary blades 134 on the front side of the rotor 10 of the apparatus for accelerating the rotational speed of the pulp. A precondition for the use of the auxiliary blades 134 is that the circumferential speed of the auxiliary blades 134 is higher than the rotational speed of the pulp rotating in the inlet channel 54. Moreover, said auxiliary blades 134 may, of course, be replaced by axial extensions 136 of the blades 46 of the flange 20 of the rotor 10 (also shown with broken lines), whereby blades 46, 136 are thus continuous, or both the axial extensions 136 and the auxiliary blades 134 may be used. The operation of the apparatus may be illustrated as follows:

pressure energy→kinetic energy+additional energy→pressure energy, in other words by introducing additional energy the separation of gas from pulp is facilitated and on the other hand the discharge pressure is raised. By adjusting the feed of the additional energy, for example, by dimensioning of auxiliary blades 134 or by changing the rotational speed, it is possible to adjust the amount of gas being separated in the apparatus and the energy consumption of the auxiliary blades reasonable.

Figure 5:
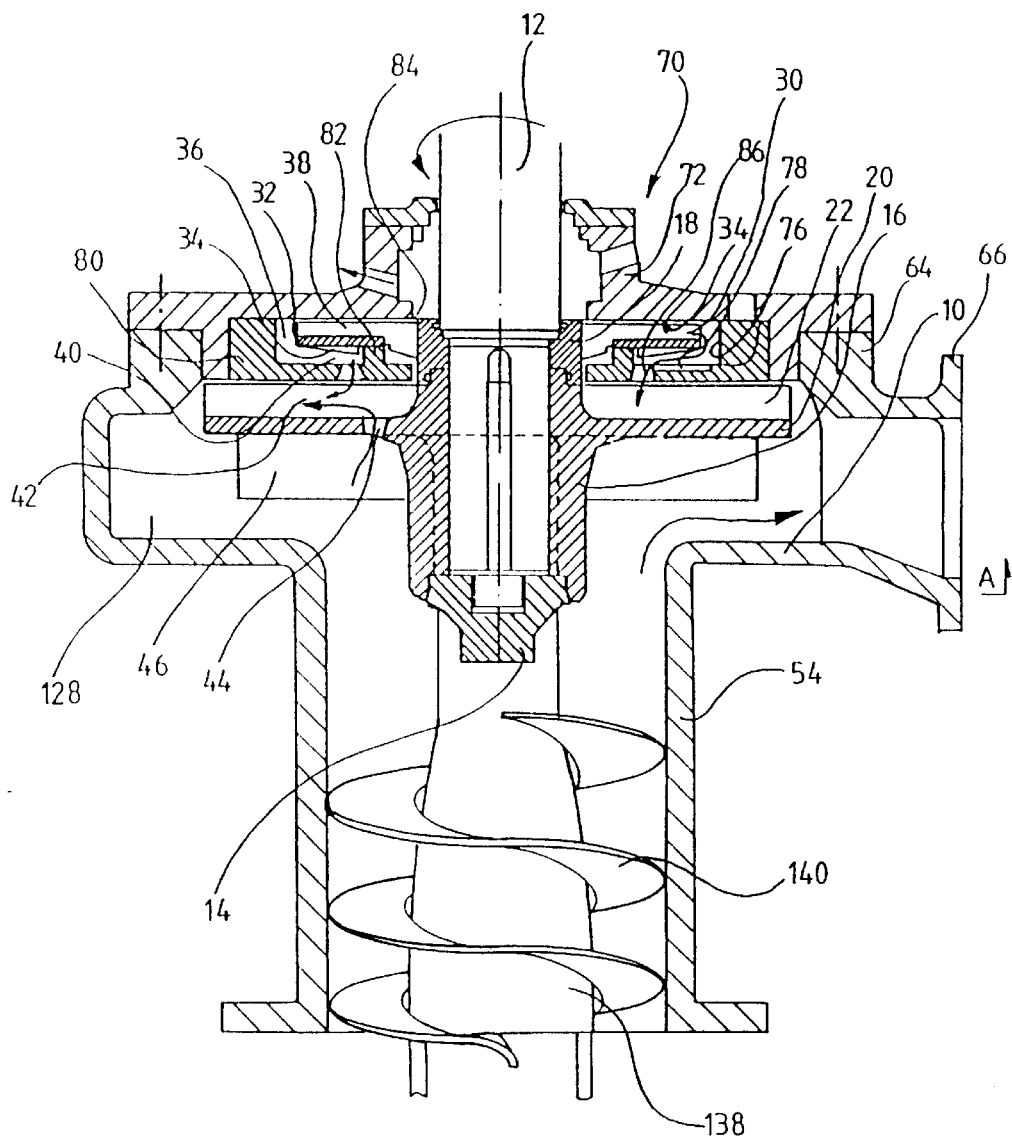
FIG. 5 illustrates an apparatus in accordance with a third embodiment of the present invention.

FIG. 5 illustrates an apparatus in accordance with a more complicated embodiment, which is already designed for treating pulps which may form a fiber matting liable to clog the flow channel. In other words the consistency of the pulp may vary between 8 and 18 percent or sometimes even exceed it. Then the basic principle is that at least one of the walls of said flow channel is movable thus preventing the accumulation of fibers to a fiber matting. In an embodiment in accordance with the drawing the center of the flow channel 54 is provided with an extension 138 of the rotor 10, which may be a pipe or a closed space with a substantially smooth surface but it is possible to provide the surface with small protrusions, which more efficiently keep the pulp in a turbulent movement close to the surface and prevent the clogging of the flow channel. The end of the extension 138 of the rotor is preferably provided with blade-like members as shown in FIG. 5, which preferably extend to the inside of the pulp vessel in order to fluidize the pulp. At least one spiral strip 140, extending radially from the extension 138 of the rotor 10 to the wall of the inlet channel 54, is attached to the wall of the flow channel 54. Said construction ensures that the pressure difference between the spiral housing 128 of the apparatus and the inlet channel (not shown) is not able to level down at least along the wall of the inlet channel 54, but only between the extension 138 of the rotor 10 and the spiral strip 140, because, of course, a reasonable clearance must be maintained between the extension 138 and spiral the strip 140 in order to avoid mechanical contact. Also it must be noted that although the drawing shows only the blades 46 of the flange 20 of the rotor 10, they may either continue axially inside the inlet channel 54, or the inlet channel 54 may be provided with auxiliary blades, as already shown in FIG. 4.

Figure 6:
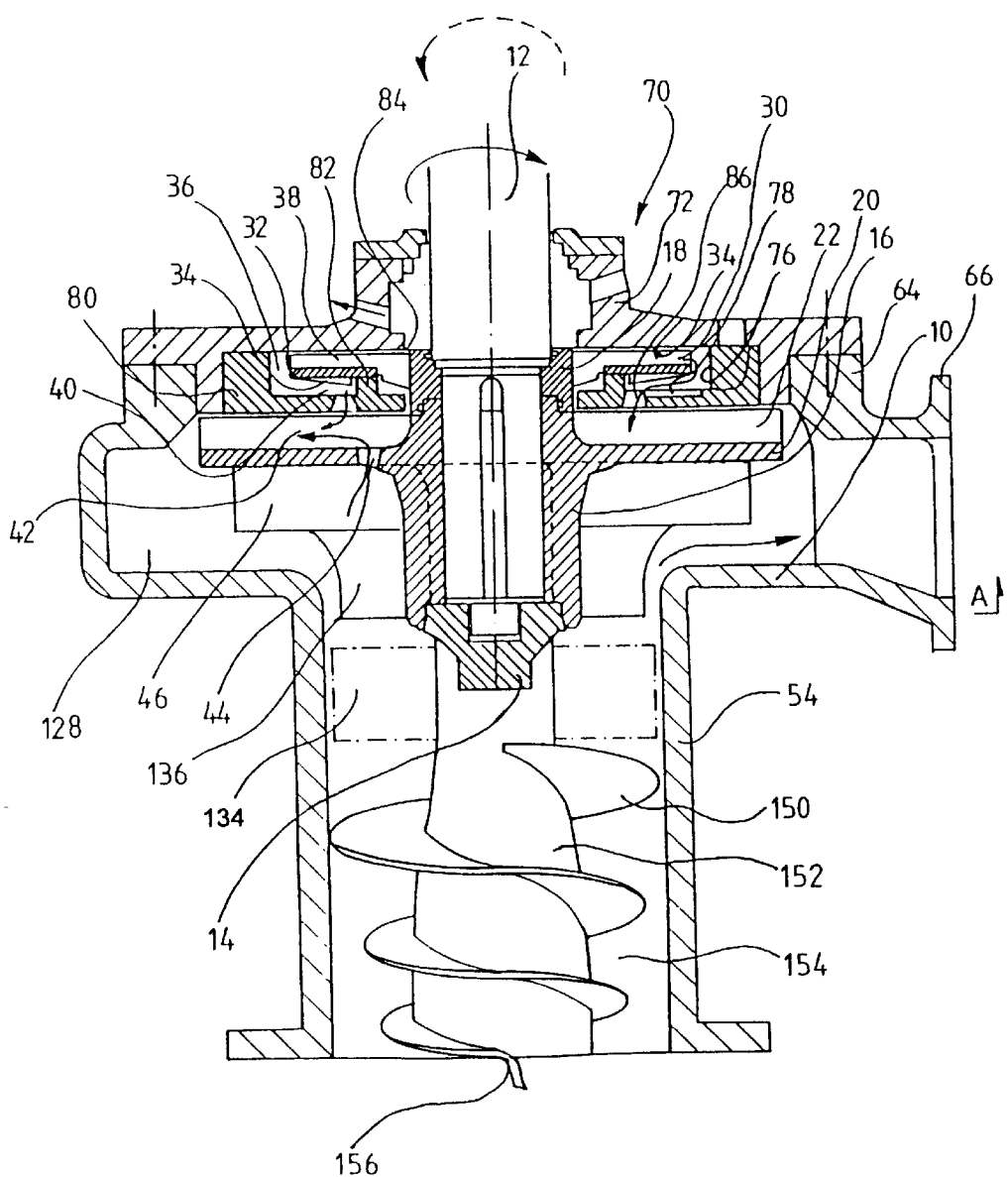
FIG. 6 illustrates an apparatus in accordance with a fourth embodiment of the present invention.

FIG. 6 illustrates yet another, the most complicated, embodiment in accordance with the present invention, in which a thread 150 is mounted on an extension 152 of the rotor 10 in such a way that the clearance between the wall thread 150 and the wall of the inlet channel 54 is adjusted as small as possible, at least at the end of the thread 150 by the flange 20 of the rotor 10. The thread 150 may be made equally "sealed" throughout the distance, in other words with equally small clearance, if the pressure difference between the inlet channel (not shown) and the spiral housing 128 is not very large, but it may also be designed to equalize the pressure differences to some extent, for example, in such a way that the pressure is allowed to evenly decrease within one or tow pitches of the thread 150. In other words the thread is allowed to leak to some extent in order to allow a gradual decrease of pressure. The extensions 136 of the blades 46 are added in FIG. 6, which extensions are disclosed as alternatives to auxiliary blades 134 shown in FIG. 4. However, the same precondition concerns the extended blades 136 as the auxiliary blades 134, i.e. The circumferential speed of the blades 136 must be higher than the rotational speed of the pulp. It may still be appreciated from FIG. 6 that the rotational direction of the rotor 10 illustrated with an arrow with unbroken line is not the same as the rotational direction of the pulp in the spiral flow channel 154 of the inlet channel 54. In the situation described with an arrow with broken line the rotational direction of pulp is the same as the rotational direction of the rotor. However, it must be emphasized that the apparatus operates in both cases. In the drawing in the case shown with an arrow with unbroken line the circumferential speed of the pulp is less than in the case when the pulp circulates in the rotational direction of rotor 10 (the arrow with broken line). thus it is clear that by changing the rotational direction of the rotor or preferably by making the threads either right-handed or left-handed respectively it is possible to increase or decrease the circumferential speed of the pulp. At high pressure differences it is preferable to slow down the rotational speed of the pulp in this manner. When considering the operation of the apparatuses it must be born in mind that the right- or left-handedness always determines the rotational direction of the pulp also when the pulp is discharged, regardless of what the rotational direction of the rotor is. The embodiment in FIG. 6 is provided with an extension 156 which is at least nearly axial and extends to the inlet channel of the thread 150 or possible to the pulp vessel and its purpose is to generate turbulence in the inlet channel or in the pulp vessel to facilitate, similarly to the blade-like members shown in FIG. 5, the flow of the pulp to the inlet channel 54 and to readily lead the flow of the pulp from axial to spiral. Finally it may also be stated of the embodiment of FIG. 6 that it is not always necessary to have a thread operated by the extension of the rotor, but, of course, also a separately operated thread is possible.

It is characteristic of all the embodiments described above that the angle of the thread, the so-called flow angle, i.e. the angle between the thread and the level cutting the inlet channel perpendicularly is less than 30 degrees, preferably less than 15 degrees and most preferably less than 10 degrees.

The apparatus in accordance with the present invention operates as described above in connection with the different embodiments. How the gas separated to the center of the apparatus is discharged, is already described above in the WO patent application of A. Ahlstrom Corporation mentioned as prior art.

EXAMPLE 1

Gas Separation Apparatus

When a pressure of about 5 bar prevails in the pulp vessel, it is possible to convert it to a rotational movement, the speed of which is about 22 m/s. Respectively, it may be considered that the rotational speed of the rotor of the gas separator, which is required for preventing the clogging of the pulp being discharged from the mass tower, is about 1500 rpm, resulting in that the circumferential speed of the rotor having a diameter of 150 mm is about 11.8 m/s. It is appreciated that if the rotational direction of the pulp determined by the rotor is the same as the rotational direction of the rotor, the circumferential speed of the pulp is about 34 m/s and if the rotational direction of the rotor is against the rotational direction of the pulp, the circumferential speed is about 10 m/s.

Figure 7:
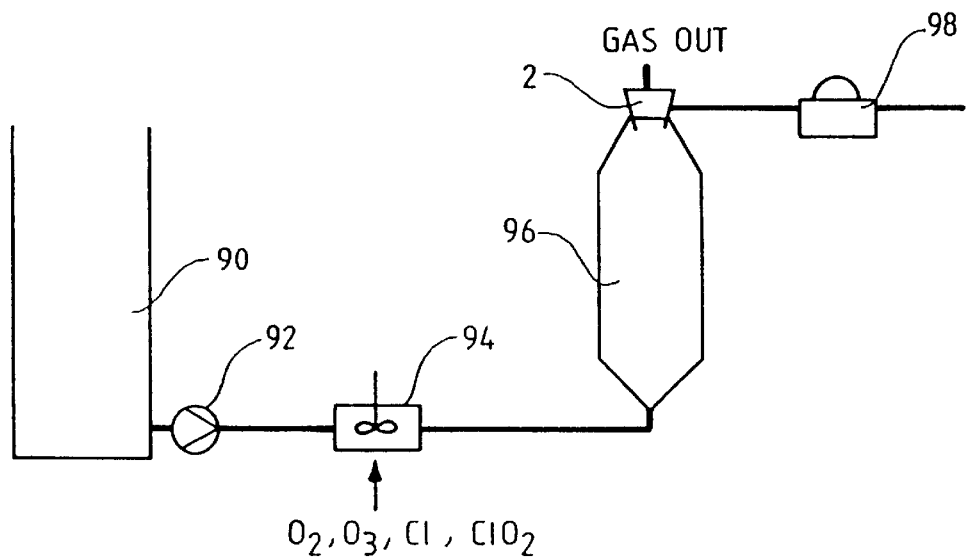
FIG. 7 illustrates a preferred process embodiment of the method in accordance with the present invention.

FIG. 7 illustrates a preferred application of an apparatus in accordance with the present invention. The schematic illustration describes the flow of the pulp from a cellulose pulp vessel 90 pumped by an MC® pump 92 through a feed mixer 94 for bleaching chemical (e.g. $O_2$, $O_3$, Cl, $ClO_2$) to a bleaching tower 96, the discharge end of which is provided with a gas separation apparatus 2 in accordance with the present invention. In the preferred embodiment of FIG. 7 the discharge of pulp from the tower 96 is preferably carried out by said separation apparatus 2 in such a way that the extension, or extensions if two threads set one within the other are used, of the thread of the rotor 10 extending to the discharge opening of the tower fluidize(s) the pulp and enable(s) the discharge thereof to the separation apparatus, the blades 46 of which again raise the pressure of the bleached suspension in such a way that it may be supplied directly without any separate feed means to a washer 98, which may be either a pressure diffuser or a so-called MC® drum washer.

The method in accordance with the present invention is described more in detail with reference to FIG. 7, in which pulp is pumped by a pump 92 to a chemical mixer 94, a reactor 96, a gas separator 2 and a washer 98. The whole process is carried out in a closed space without any contact between the air and the pulp. All means are pressurized and closed. Gas separation apparatus 2 operates partially as a pump, whereby the pressure of the pulp is raised prior to the washer. The washer is pressurized and closed. It is preferable to carry out the whole treatment at the same consistency, most preferably at the range of 8 to 20%.

In order to realize the method some of the apparatus required already exist and other necessary equipment are being developed. The high consistency pump 92 necessary in the process, an MC® pump, is disclosed, for example, in U.S. Pat. No. 4,780,053. Japanese patent 1617019 discloses a chemical mixer. A pressurized washer is disclosed in U.S. Pat. No. 4,952,314. A gas separation apparatus essential in the method is illustrated above with reference to FIGS. 3–6.

Figure 8:
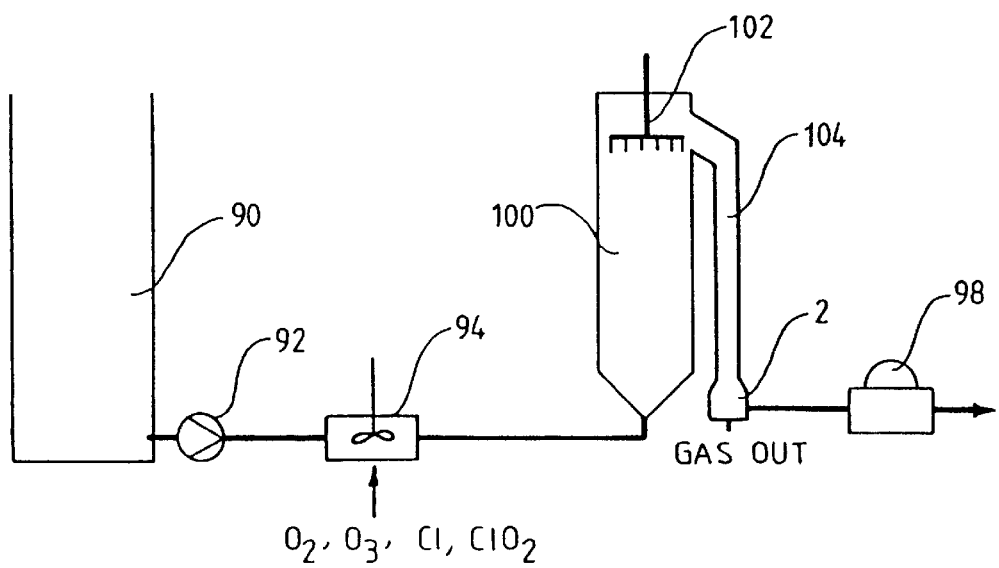
FIG. 8 illustrates another process embodiment of the method in accordance with the present invention.

FIG. 8 illustrates another application of the apparatus in accordance with the present invention, in which pulp is pumped from a temporary pulp vessel 90 by an MC® pump 92 through a feed mixer 94 of bleaching chemical (e.g. $O_2$, $O_3$, Cl, $ClO_2$) to a bleaching tower 100, the discharge of which is carried out by means 102 known per se to a drop leg 104, which is preferably provided with a gas separation apparatus 2 in accordance with the embodiment of FIG. 6. Also in this case the separation apparatus feeds the pulp directly to the washer. The apparatus in accordance with the present invention may be used in pressurized, but also in open unpressurized processes, which, of course, results in the use of a high rotational speed in order to obtain a sufficient circumferential speed and centrifugal force. It must also be noted that although bleaching chemicals are mentioned above, also other substances and organisms used, and to be used in the future, in the treatment of fiber suspension, such as enzymes of fungi, are also covered. Thus the term "chemical" in the above description must be understood in a broader sense than what is conventionally understood by said term "chemical".

It must also be noted that the spiral rotational movement of pulp may be brought about also by constructions other than a thread. It may be considered that, for example, a number of nozzles are mounted partly tangentially, partly axially to the rotationally symmetric member so that the pulp is discharged through the nozzles into said space converting the pressure energy to kinetic energy. It is, of course, possible to arrange into said member the thread illustrated in the previous embodiments if so desired, or a rotatable rotor, if it is considered necessary. Said member with its flange means again may be connected to a spiral housing described in connection with the previous embodiments.

As is appreciated from the above disclosed embodiments, a new gas separator type has been developed, which generally speaking and regardless of the above description of the applications concentrated on wood processing industry, is applicable in all apparatus in which gas must be separated from a material behaving like a liquid. The apparatus is very suitable for the wood processing industry, for example, because it is able to treat very solid and weakly flowing materials and additionally, beside the primary object, is able to discharge the bleaching tower very efficiently and in an energy saving way, if so desired, and to feed the pulp directly to the washer. However, it must be noted that the method and apparatus in accordance with the present invention may may be applied also in apparatus where it is not necessary to utilize its discharge or pumping ability. Thus the above described embodiments must not be seen as restricting the scope and protection of the invention, but merely exemplifying a number of most preferred construction alternatives and applications. Thus all details illustrated in connection with different embodiments such as auxiliary blades, extensions of blades, extensions of shafts, clearances, etc. may be used, where applicable, in all embodiments where they are not explicitly mentioned. It is also not characteristic of the present invention that, although the term "spiral housing" is used throughout the whole patent application, said portion is specifically spiral, but also other forms applicable in the particular use or purpose may come into question. The scope of protection of the present invention is disclosed and determined by the enclosed claims, alone.

What is claimed is:

1. A closed system in which gas is separated from a liquid, or a cellulose fiber suspension, comprising:

a first conduit and a second conduit;

a spiral housing having a central axis, a substantially axial liquid or suspension inlet channel with an inner wall, a liquid or suspension outlet, and a separated gas outlet, said separated gas outlet adjacent said central axis;

a shaft disposed within said spiral housing and connectable to means for rotating said shaft about said central axis;

a flange extending generally perpendicular to said shaft within said spiral housing for rotation about said central axis, at least one opening extending through said flange generally parallel to said axis of rotation;

a plurality of blades mounted to said flange on a face of said flange opposite said liquid suspension inlet;

path defining means disposed within said inlet channel for effecting spiral rotational movement of the liquid or suspension as it moves in said inlet channel toward said spiral housing, defining at least one spiral path, so that the gas starts to separate from the liquid or suspension in the at least one spiral path; and said liquid or suspension inlet and said liquid or suspension outlet connected to said first and second conduits to provide a close system.

2. A system as recited in claim 1 further comprising a rotor connected to said flange on the face thereof closest to said liquid or suspension inlet, and an extension of said rotor extending into said inlet channel and rotatable with said rotor and said flange; and wherein said path defining means comprises at least one spiral strip connected to said rotor extension and extending radially therefrom toward the inner wall of said inlet channel.

3. A system as recited in claim 2 wherein said at least one spiral strip encircles said extension and has a clearance as small as possible with said inlet inner wall over at least a portion of the extent of said strip.

4. A system as recited in claim 3 wherein at least one spiral strip has different diameter portions.

5. A system as recited in claim 4 wherein said spiral strip has a gradually increasing diameter from the beginning of said inlet channel moving toward said spiral housing.

6. A system as recited in claim 5 further comprising a substantially axial extension of said at least one spiral strip on said extension extending outwardly past the beginning of said inlet channel.

7. A system as recited in claim 2 wherein said rotor has a plurality of pumping blades.

8. A system as recited in claim 3 wherein said rotor has a plurality of pumping blades.

9. A system as recited in claim 4 wherein said rotor has a plurality of pumping blades.

10. A system as recited in claim 2 further comprising a substantially axial extension of said at least one spiral strip on said extension extending outwardly past the beginning of said inlet channel.

11. A system as recited in claim 3 further comprising a substantially axial extension of said at least one spiral strip on said extension extending outwardly past the beginning of said inlet channel.

12. A system as recited in claim 4 further comprising a substantially axial extension of said at least one spiral strip on said extension extending outwardly past the beginning of said inlet channel.

13. A system as recited in claim 3 wherein said clearance is provided over substantially the entire extent of said strip.

14. A system as recited in claim 13 wherein said rotor has a plurality of pumping blades.

* * * * *